April 16, 1929.  E. X. SCHMIDT  1,708,958
METHOD OF AND APPARATUS FOR CONTROLLING THE QUALITY OR TOTAL
HEATING VALUE OF A FLOWING MIXTURE OF COMBUSTIBLE FLUIDS
Filed April 27, 1927
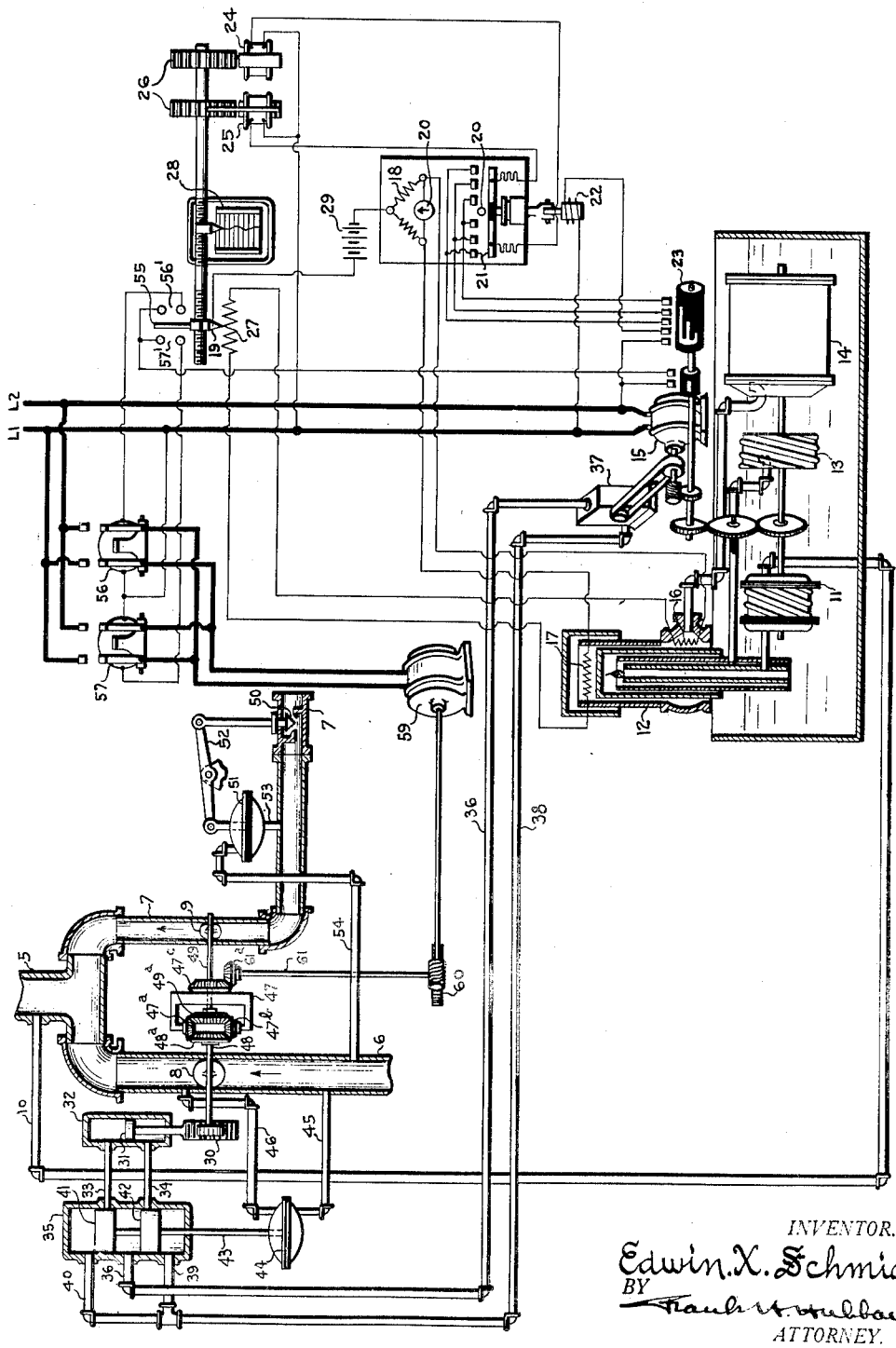
INVENTOR.
Edwin. X. Schmidt
BY
ATTORNEY.

Patented Apr. 16, 1929.

1,708,958

UNITED STATES PATENT OFFICE.

EDWIN X. SCHMIDT, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR CONTROLLING THE QUALITY OR TOTAL HEATING VALUE OF A FLOWING MIXTURE OF COMBUSTIBLE FLUIDS.

Application filed April 27, 1927. Serial No. 186,965.

This invention relates to improvements in methods of and apparatus for controlling the quality or total heating value of a flowing mixture of combustible fluids.

In the copending application of Clarence S. Pinkerton, Serial #103,763, filed April 22, 1926, there is disclosed a method and apparatus of the above character wherein proportional variations are quickly effected in the rate of flow of one of the constituent fluids in accordance with variations in the rate of flow of another of the same, the rate of flow of said first mentioned fluid being additionally and more accurately adjusted to provide a combustible mixture of substantially constant predetermined quality of total heating value.

An object of the present invention is to provide an improved method and apparatus for automatically maintaining a predetermined proportionality between the rates of flow of the constituents of a combustible mixture under conditions of rapid variation in said rates of flow, whereby the quality or total heating value of the mixture is maintained substantially constant.

Another object is to provide an improved method and apparatus of the above character whereby the rate of flow of one of the fluid constituents of a composite combustible fluid flow may be varied in accordance with the quality or total heating value per unit quantity of the latter, to thereby maintain said total heating value substantially constant.

Other objects and advantages of the invention will hereinafter appear.

The accompanying drawing, consisting of a single figure, illustrates schematically and diagrammatically one embodiment of my invention, and the same will now be described, it being understood that various changes may be made in the details of construction and operation of the device illustrated without departing from the spirit and scope of the invention as defined in the appended claims.

In the drawings the numeral 5 designates a conduit through which a mixture of combustible fluids from the conduits 6 and 7 is adapted to flow to the desired point or points of use, said combustible fluids being of different quality or combustion calorific value. Conduit 6 is provided with an adjustable valve 8 of any suitable or well known construction, means being provided, as hereinafter described, for automatically effecting adjustment of said valve to maintain a predetermined pressure drop across the same. Moreover, valve 8 is connected through suitable gearing with a similar valve 9 in conduit 7, whereby a given movement of valve 8 results in movement of valve 9 to a like degree, thus tending to maintain a pretermined proportionality in the rates of supply of the respective combustible fluids.

Thus assuming adjustment of valves 8 and 9 such as to provide a combustible mixture of predetermined total heating value per unit quantity such adjustment will be maintained pending variation in the demand for the combustible mixture in conduit 5, or variation in the quality or total heating value per unit quantity of said mixture. On the other hand, any variation in the demand for the combustible mixture will result in a corresponding variation in the pressure drop across valve 8. Pipes 45 and 46 lead from conduit 6 on opposite sides of valve 8 to the opposite sides of a pressure responsive diaphragm 44, whereas a rod or stem 43 affords connection between said diaphragm and a pair of spaced blocks or pistons 41, 42 which are slidable within a cylinder 35. Pistons 41, 42 when in the normal or neutral position illustrated are adapted to interrupt communication between the interior of cylinder 35 and the interior of a cylinder 32 above and below a piston 31 slidable in the latter. However, upon an increase in the pressure drop across valve 8, due to an increase in the demand for the mixture in conduit 5, pistons 41 and 42 are moved upwardly by diaphragm 44 whereby a pipe 36 is put in communication with cylinder 32 above piston 31, through a pipe 33, and a pipe 39 is put in communication with cylinder 32 below piston 31, through a pipe 34. Pipes 36 and 39 are connected with the outlet and inlet ends respectively of a fluid pressure pump 37, which is constantly driven by a suitable motor 15. Piston 31 is connected by a suitable rack and pinion gearing 30 with valve 8, so that upon downward movement of said piston under the influence of the fluid pressure from pump 37 said valve is moved accordingly until the same is again in a position to provide the predetermined pressure drop thereacross. Diaphragm 44 and the attached pistons 41, 42 thereupon move to the neutral position illustrated to maintain the aforedescribed adjustment of valve 8.

Rigidly secured to shaft 48 of valve 8 is a bevel gear 48ª, and rigidly secured to shaft 49 of valve 9 is a bevel gear 49ª, said gears being adapted to mesh with bevel gears 47ª and 47ᵇ rotatably carried by a frame 47. Frame 47 is mounted to rotate with respect to shaft 49 and rigidly secured to said frame is a bevel gear 47ᶜ adapted to mesh with a bevel gear 61ª rigidly secured to a shaft 61. Shaft 61 is connected through suitable worm and pinion gearing 60 with the shaft of a normally idle motor 59, with the result that frame 47 is normally locked against rotation. Thus it is apparent that upon a given angular adjustment of valve 8 in the manner aforedescribed a corresponding angular adjustment of valve 9 is effected. Under such conditions the proper proportionality of the constitutent combustible fluid flows is maintained notwithstanding variations in the rate of flow of the mixture thereof.

In order to insure a pressure on the upstream side of valve 9 corresponding to the pressure on the upstream side of valve 8 I provide a suitable needle valve 50 or the like, subject to control by diaphragm 51 through suitable leverage 52. One side of said diaphragm is subjected through pipe 53 to the pressure of fluid on the upstream side of valve 9, and the other side of said diaphragm is subjected through pipe 54 to the pressure of fluid on the upstream side of valve 8; whereby any variation in the relative values of said pressures will result in a corresponding opening or closing movement of valve 50 to equalize the same. While I have shown means for maintaining the pressures on the upstream sides of valves 8 and 9 substantially equal, it will be apparent to those skilled in the art that the desired results may be obtained through employment of means for maintaining said pressures merely proportional.

The aforedescribed elements cooperate to afford rapid automatic adjustment of the relative rates of flow of the combustible fluid constituents of the composite fluid flow under conditions of constant quality or total heating value per unit quantity of the respective constituent flows. However, in practice either or both of said constituent flows may be subject to rather wide variations in quality or total heating value per unit quantity and it is necessary or desirable to provide means to compensate for such variations.

Accordingly the conduit 5 is tapped and a continuous sample of the mixed fluids is withdrawn through pipe 10 by means of a suitable wet displacement pump 11, as described in the aforementioned Pinkerton application. Pump 11 is adapted to supply the sample to the burner of a calorimeter indicated generally at 12, additional wet displacement pumps 13 and 14 being provided for respectively supplying the calorimeter with combustion air and cooling air. Pumps 11, 13 and 14 may be driven by the aforementioned motor 15; whereas by the arrangement illustrated the test gas, combustion air and cooling air are supplied in predetermined proportions under like conditions of temperature, pressure and saturation.

Resistance thermometers 16 and 17 are arranged in the stream of cooling air to be subjected respectively to the temperature of the latter before and after the heat transfer, said thermometers being connected in a Wheatstone bridge, indicated at 18, having associated devices arranged to be influenced thereby for operating suitable instrumentalities including a member 19 adapted to be moved in a direction and to a degree corresponding with the character and value of any variations in the total heating value per unit quantity of the test gas.

The instrumentalities directly controllable by the Wheatstone bridge may preferably include a galvanometer needle 20, having associated therewith a switch 21 and an operating solenoid 22 which serves in conjunction with a contact drum 23 also driven by motor 15 to control the operating electromagnets 24 and 25 of a ratcheting mechanism 26. Said ratcheting mechanism in turn is utilized to move the member 19 for varying the resistance of an adjusting rheostat 27 connected in the Wheatstone bridge circuit, to restore the balance of the latter following unbalancing thereof due to variation in the quality or total heating value per unit quantity of the mixture of fluids in conduit 5. A recorder 28 may also be connected with the driven member of said ratcheting mechanism if desired.

In practice the motor 15 together with the Wheatstone bridge and the various operating coils may all be supplied from a common source of direct current, although in the construction illustrated the Wheatstone bridge is supplied with current from a battery 29, the other instrumentalities being supplied from a separate source of current indicated at lines L¹, L².

The aforedescribed elements comprise the essentials of a standard type of calorimeter and hence warrant no more extended description herein.

Thus upon a given increase or decrease in the total heating value per unit quantity of the combustible mixture flowing through conduit 5, as measured by the calorimeter in the manner aforedescribed, a bridging contractor 55 carried by the member 19 is brought into engagement with one or the other of two pairs of contacts 56' and 57'.

Said pairs of contacts are adapted to respectively control the energizing circuits of reversing switches 56 and 57 whereby said motor 59 may be connected across lines $L^1$, $L^2$ for operation in one direction or the other. Operation of motor 59 is adapted through worm and pinion gearing 60 to effect rotation of bevel gear $61^a$, and this in turn effects rotation of bevel gear $47^c$ and the frame 47 to which it is attached. Such rotation of frame 47 effects planetary movement of gears $47^a$ and $47^b$, whereas in the absence of movement of piston 31 valve 8 and consequently bevel gear $48^a$ will be held against rotation. Thus the movement of gears $47^a$ and $47^b$ will be transmitted solely to the valve 9 to increase or decrease the proportional amount of fluid flowing through conduit 7 with respect to that flowing through conduit 6, until the predetermined total heating valve per unit quantity of the mixture of fluids flowing through conduit 5 is restored.

In the above manner the device is adapted to compensate for changes in the total heating value per unit quantity of one or more of the constituent combustible fluid flows, and consequently of the mixture thereof; which changes ordinarily take place quite slowly. Moreover, if there is a sudden increase or decrease in the demand for the combustible mixture, the means aforedescribed will effect simultaneous opening or closing of valves 8 and 9 to like degrees, whereby the predetermined proportionality of the respective fluids in the mixture thereof will be maintained. For example, if the demand for the combustible mixture were doubled, valves 8 and 9 would be simultaneously operated to permit twice as much fluid to flow through the conduits 6 and 7, respectively; whereas any variation in the total heating value per unit quantity of the mixture of combustible fluids is compensated for through operation of valve 9 alone.

What I claim as new and desire to secure by Letters Patent is:

1. The method of controlling the quality or total heating value per unit quantity of a flowing mixture of combustible fluids, which comprises simultaneously controlling the rates of flow of fluids of different total heating values to provide a fluid mixture of predetermined constant total heating value per unit quantity irrespective of variations in the rate of flow of said mixture due to variations in the demand therefor and independently varying the rate of flow of certain of said constituent fluids in accordance with variations in the total heating value per unit quantity of the mixture thereof to compensate for variations in the total heating value per unit quantity of any of the same.

2. The method of controlling the quality or total heating value per unit quantity of a flowing mixture of combustible fluids, which comprises simultaneously effecting proportional variations in the rates of supply of the constituent fluids under conditions of variations in the demand for the mixture thereof, mixing the fluids and burning a sample of the mixture to ascertain the quality or total heating value per unit quantity of the latter, and independently varying the rate of flow of one of said constituent fluids in accordance with the value so ascertained to compensate for variations in the latter from a predetermined value.

3. The method of controlling the quality or total heating value per unit quantity of a flowing mixture of combustible fluids, which comprises supplying the constituent fluids under like pressure conditions, simultaneously varying the rates of supply of the fluids, while maintaining a predetermined proportionality thereof, to compensate for variations in demand for the mixture thereof, mixing the fluids and burning a sample of the mixture to ascertain the quality or total heating value per unit quantity of the latter, and independently varying the rate of flow of one of said constituent fluids in accordance with the value so ascertained to compensate for variations in the latter from a predetermined value.

4. The method of controlling the quality or total heating value per unit quantity of a flowing mixture of combustible fluids of different total heating values, which comprises simultaneously controlling the rates of flow of said constituent combustible fluids under conditions of variation in the demand for the mixture to maintain the proportionality between said fluid flows substantially constant, ascertaining the total heating value per unit quantity of the mixture, and supplementally varying the rate of flow of one of said fluids in response to and to compensate for variations in such value.

5. In a device of the character described, the combination with a plurality of branch conduits for combustible fluids of different quality respectively, a main conduit into which said branch conduits are adapted to discharge, a valve in each of said branch conduits and means for initially adjusting said valves to provide a flowing mixture of predetermined quality or total heating value per unit quantity, means for automatically adjusting one of said valves to maintain a predetermined pressure drop thereacross, associated means for effecting simultaneous corresponding adjustment of another of said valves to thereby maintain the proportionality of said fluids substantially constant irrespective of variation in the rates of flow thereof due to variations in the demand for the mixture, and means responsive to variations in the quality or total heating value per unit quantity of the mixture of fluids for effecting adjustment of one of said valves independently of the other to thereby compensate for such variations, said last mentioned means including a calorimeter adapted to burn a continuous sample of said mixture.

6. In a device of the character described, the combination with a plurality of branch conduits for combustible fluids of different quality or total heating value per unit quantity respectively, a main conduit into which said branch conduits are adapted to discharge, a valve in each of said branch conduits and means for initially adjusting said valves to provide a flowing mixture of predetermined quality, means for maintaining proportional pressures at the inlet sides of said valves, means for automatically adjusting one of said valves to maintain a predetermined pressure drop thereacross, associated means for effecting simultaneous corresponding adjustment of another of said valves to thereby maintain the proportionality of said fluids substantially constant irrespective of variation in the rates of flow thereof due to variations in the demand for the mixture, and means comprising a calorimeter responsive to variations in the quality of the mixture of fluids for effecting adjustment of one of said valves independently of the other to thereby compensate for such variations.

7. In a device of the character described, the combination with a plurality of branch conduits for combustible fluids of different quality or total heating value per unit quantity respectively, a main conduit into which said branch conduits are adapted to discharge, a valve in each of said branch conduits and means for initially adjusting said valves to provide a flowing mixture of predetermined quality, means for maintaining substantially equal pressures at the inlet sides of said valves, means for automatically adjusting one of said valves to maintain a predetermined pressure drop thereacross, associated means for effecting simultaneous corresponding adjustment of another of said valves to thereby maintain the proportionality of said fluids substantially constant irrespective of variation in the rates of flow thereof due to variations in the demand for the mixture, and means comprising a calorimeter responsive to variations in the quality of the mixture of fluids for effecting adjustment of one of said valves independently of the other to thereby compensate for such variations.

8. In a device of the character described, the combination with a plurality of branch conduits through which combustible fluids of different quality or total heating value per unit quantity are respectively adapted to flow, a main conduit through which the mixture of said combustible fluids is adapted to flow, a valve in each of said branch conduits and means for initially adjusting said valves to provide a flowing mixture of predetermined quality, means for maintaining substantially equal pressures at the inlet sides of said valves, said means comprising an additional valve in one of said branch conduits, means for effecting operation of said valve in accordance with the difference in pressures at the upstream sides of said first mentioned valves to thereby maintain said pressures of substantially equal value, means including fluid pressure operated means for automatically adjusting one of said first mentioned valves to maintain a predetermined pressure drop thereacross, associated means for effecting simultaneous corresponding adjustment of another of said first mentioned valves to thereby maintain the volumetric proportionality of said fluids substantially constant irrespective of variation in the rates of flow thereof due to variations in the demand for the mixture, means for withdrawing a continuous sample of the mixture of fluids from said main conduit, a calorimeter for burning said sample, and means responsive to the determinations of said calorimeter for effecting independent adjustment of one of said first mentioned valves whereby the quality of the mixture of combustible fluids is maintained substantially constant.

In witness whereof, I have hereunto subscribed my name.

EDWIN X. SCHMIDT.